(12) United States Patent
Ono (10) Patent No.: US 8,469,773 B2
(45) Date of Patent: Jun. 25, 2013

(54) GOLF BALL DEBURRING APPARATUS

(75) Inventor: Takahisa Ono, Fujisawa (JP)

(73) Assignee: NIKE, Inc., Beaverton, OR (US)

( * ) Notice: Subject to any disclaimer, the term of this patent is extended or adjusted under 35 U.S.C. 154(b) by 2 days.

(21) Appl. No.: 12/968,033

(22) Filed: Dec. 14, 2010

(65) Prior Publication Data

US 2012/0149285 A1 Jun. 14, 2012

(51) Int. Cl.
*B24B 49/00* (2012.01)

(52) U.S. Cl.
USPC ............... 451/5; 451/163; 451/164; 451/173

(58) Field of Classification Search
USPC ..................... 451/5, 11, 49, 163, 164, 173
See application file for complete search history.

(56) References Cited

U.S. PATENT DOCUMENTS

| | | | |
|---|---|---|---|
| 3,561,908 A | 2/1971 | Reinfeld | |
| 4,667,444 A * | 5/1987 | Langlois et al. | ............. 451/240 |
| 4,779,387 A * | 10/1988 | Reid et al. | ............. 451/9 |
| 4,894,958 A | 1/1990 | Takasaki | |
| 5,348,462 A | 9/1994 | Cohen et al. | |
| 5,472,330 A * | 12/1995 | Oka et al. | ............. 425/142 |
| 5,494,631 A | 2/1996 | Oka et al. | |
| 5,554,337 A | 9/1996 | Ihara | |
| 5,611,723 A | 3/1997 | Mitoma et al. | |
| 5,658,188 A | 8/1997 | Yamada et al. | |
| 6,126,522 A | 10/2000 | Endo et al. | |
| 6,129,611 A | 10/2000 | Yamaguchi | |
| 6,165,049 A | 12/2000 | Yamaguchi | |
| 6,168,407 B1 | 1/2001 | Kasashima et al. | |
| 6,248,974 B1 * | 6/2001 | Wai | ............. 219/121.69 |
| 6,597,445 B2 | 7/2003 | Sugimoto | |
| 7,273,574 B2 * | 9/2007 | Yamakawa et al. | ............. 264/161 |
| 7,530,906 B2 | 5/2009 | Ono | |

FOREIGN PATENT DOCUMENTS

| | | |
|---|---|---|
| JP | 52021063 A * | 2/1977 |
| JP | 9155744 | 6/1997 |
| JP | 10179808 | 7/1998 |
| KR | 20080088482 | 10/2008 |

OTHER PUBLICATIONS

English translation of JP 52 021063, Nippon.*
Certified English-language Translation of Korean Prior Art Search Report in Korean Application No. 10-2011-0133820 dated Dec. 28, 2011.
European Search Report in European Patent Application No. 11193554.0, mailed on Mar. 20, 2012.
Notification of Grant of Patent Right for Utility Model in Chinese Utility Model Patent Application No. 201120520595.5, mailed on Jul. 26, 2012.
Patent Examination Report No. 1 in Australian Patent Application No. 2011253902, mailed on Nov. 29, 2012.
Notice of Allowance in Canadian Patent Application No. 2,760,596, mailed on Feb. 29, 2012.
Notice of Allowance in Korean Patent Application No. 10-2011-0133820, mailed on Oct. 8, 2012.

* cited by examiner

*Primary Examiner* — Maurina Rachuba
(74) *Attorney, Agent, or Firm* — Plumsea Law Group, LLC (57) ABSTRACT

A structure for deburring a ball is provided. The structure includes an arm, a gear structure for changing the effective length of the arm, and a cam structure for changing the effective angular position of the arm. A finger having an abrasive surface reciprocates on the arm. A ball is placed in a rotating holder and positioned in effective position for the abrasive surface to contact and remove at least one burr on the ball.

20 Claims, 6 Drawing Sheets

GOLF BALL DEBURRING APPARATUS

FIELD

The present disclosure relates generally to a structure used to deburr a golf ball outer surface. More specifically, the present disclosure relates to a structure that allows for selective removal of burrs on a golf ball.

BACKGROUND

Many golf balls are made of multiple layers. Many of these golf balls are manufactured using an injection molding technique. While much of the interior surface of a typical golf ball mold is smooth, various surface discontinuities are created on the product within common molding techniques.

In many instances, golf balls are molded using an injection mold. When an injection mold is used, various features are common. First, there is typically an opening for an injection nozzle to be inserted into the mold cavity. Next, there are frequently one or more vent holes to vent air when the mold is being filled with resin or other material. Finally, there may be holes for pins that are inserted to stabilize an intermediate layer while it is surrounded with another material. Each of these openings in the mold creates a discontinuity in the mold surface. Each discontinuous area may create a discontinuity or burr on the molded ball.

Discontinuities and burrs on the ball are generally undesirable. The aerodynamic properties of the ball are typically important to a golfer. Any area of discontinuity may tend to alter the aerodynamic properties of the ball and create an unsatisfactory flight path. Accordingly, there have been systems and structures used to deburr the balls after molding.

In some prior systems, the molded ball, possibly along with other balls, has been placed into a bin and surrounded by abrasive articles, such as sandpaper, pumice, or the like. The bin is then agitated and the ball is removed. In such a system, there is an inability to precisely control the degree of abrasion on the ball, and the ball's surface may be inconsistently abraded, creating a different discontinuity.

In other prior systems, the ball may be placed within a grinder and rotated or agitated while an abrasive surface evenly abrades the entirety of the ball surface. Such a system also abrades the surface of the ball where no abrasion needs to be applied. Accordingly, while such a system may remove the burrs, it also tends to damage other areas of the ball's surface.

What is desirable is a structure and method that may be used to selectively abrade a ball's surface in areas where burrs exist, while avoiding areas that lack burrs. Such a system may tend to effectively remove burrs while also minimizing damage to other areas of the ball.

SUMMARY

In one embodiment, a deburring structure for removing at least one burr from a ball is provided. A ball holder is provided. An adjustable arm is capable of moving relative to the ball holder. A first finger is attached to the arm and is capable of reciprocating relative to the arm. The first finger includes an abrasive surface. An electronic control can be used to govern the movement of the various parts with respect to one another.

In another embodiment, a structure for deburring a ball is provided. A ball holder is provided. An arm is provided with an effective length and an effective angular position relative to the ball holder. A first cam is positioned on a first side of the arm. The first cam is capable of moving the arm to change its effective angular position relative to the ball holder. A second cam may be positioned on a second side of the arm and may also be capable of moving the arm to change its effective angular position relative to the ball holder. A gear may be positioned on one side of the arm to change the effective length of the arm relative to the ball holder. One or more fingers may be reciprocally positioned on the arm. An electronic control can be used to govern the movement of the various parts relative to one another.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The present embodiments relate to structures used to deburr golf balls. The necessity of deburring golf balls is due to the methods typically used to mold golf balls. Frequently, golf balls are made with an injection molding process. The injection molding process typically uses a mold that includes various discontinuities. Each discontinuity may cause a burr to be created on an external surface of the ball.

Figure 1:
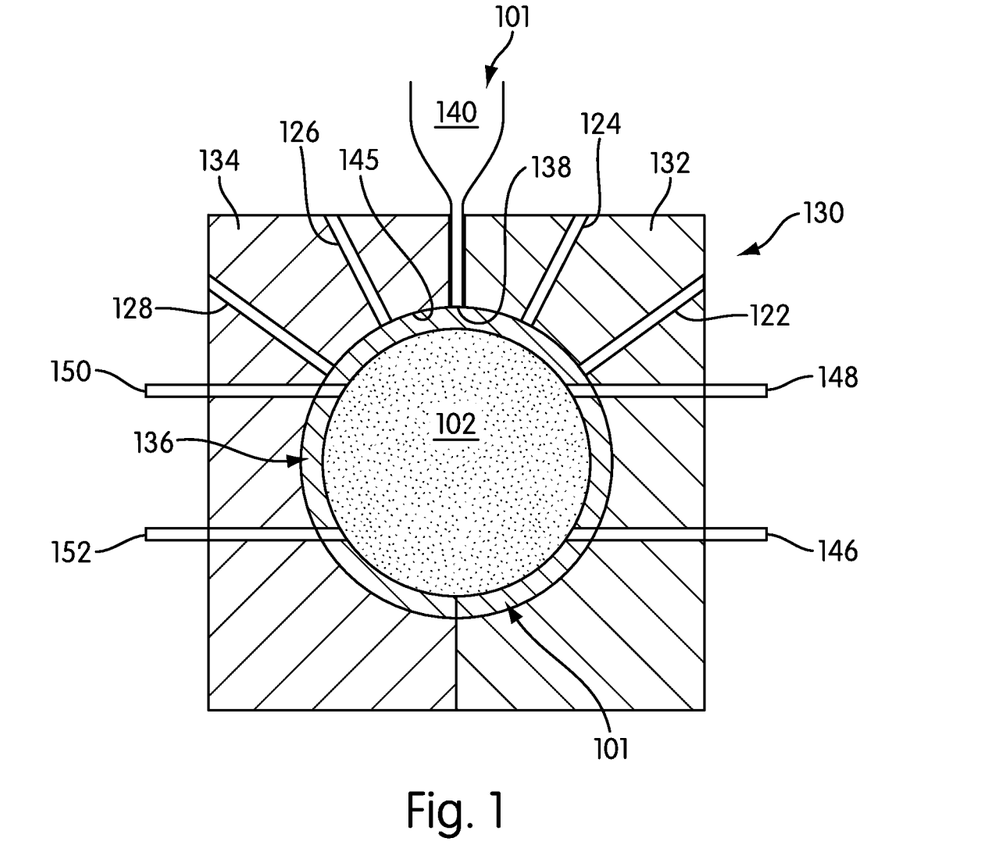
FIG. 1 is cross sectional view of a ball being molded in one embodiment of an injection mold.

FIG. 1 shows a molding step that represents the application of a final layer on a golf ball. The final molding step may be the addition of a cover layer, a top coat, or whatever final molding step a designer may deem desirable. The remaining layers of the ball internal to the final molded layer may collectively be called the interior layers and are numbered 102. In some embodiments, layer 102 is a single layer or core. In other embodiments, layer 102 may include a core, a medial layer, a mantle layer, other intermediate layers or inserts, either alone or in combination with one another.

FIG. 1 shows the use of mold 130 to form the outermost layer. Mold 130 may be one of a variety of types of molds, depending on the material to be molded therein. In FIG. 1, mold 130 is shown as a standard injection mold. Mold 130 may include first mold portion 132 and second mold portion 134. First mold portion 132 and second mold portion 134 can be separated from one another to place items in mold 130 before molding occurs or to remove the formed material after molding. First mold portion 132 and second mold portion 134 form mold cavity 136 therein. Injection port 138 may be present, for example, at the top of mold cavity 136. Injection port 138 may be in fluid communication with reservoir 140 that contains material 101. In some embodiments, material 101 may be a thermoplastic urethane, such as SURLYN. Material 101 is introduced into mold cavity 136 from reservoir 140 via injection port 138.

As material 101 is injected into mold cavity 136, air must be evacuated from mold cavity 136. Accordingly, vent holes may be incorporated into mold 130 to allow the air to evacuate. In the embodiment shown in FIG. 1, four vent holes are shown. Specifically, first vent hole 122, second vent hole 124, third vent hole 126, and fourth vent hole 128 are shown as extending at various locations between mold cavity 136 and the exterior of mold 130. The position and number of vent holes is exemplary and may be modified as desired by a person having ordinary skill in the art.

As shown in FIG. 1, one option for properly positioning interior layers 102 in mold cavity 136 is to support interior layers 102 with a plurality of pins. FIG. 1 shows the use of first pin 146, second pin 148, third pin 150, and fourth pin 152. First pin 146, second pin 148, third pin 150, and fourth pin 152 are designed to be retractable within mold cavity 136. As material 101 is injected into mold cavity 136, it fills mold cavity 136. As it begins to harden, it becomes capable of supporting interior layers 102 within mold cavity 136. As material 101 begins to harden, first pin 146 and fourth pin 152 can be retracted. As material 101 begins to further fill mold cavity 136, second pin 148 and third pin 150 can be retracted. This retraction after the partial hardening of material 101 allows interior layers 102 to remain centered within mold cavity 136 and for material 101 to evenly fill mold cavity 136. While not specifically shown and described, a similar method could be used to mold ball interior layers 102.

While four pins 146, 148, 150, 152 are shown, and while they are shown protruding only from the sides of mold cavity 136, these features should not be seen as being limiting. In some embodiments, it may be desirable to place more or fewer pins in mold cavity 136. In other embodiments, it may be desirable to space the pins more evenly throughout mold cavity 136. Finally, it may be desirable to include pins on the top or bottom sides of mold cavity 136. A person having ordinary skill in the art will be able to modify the mold design to provide an appropriate molding environment based on the materials selected and the design characteristics desired.

In FIG. 1, the pins are shown as still being in contact with inner layers 102, rather than having been retracted to be substantially flush with inner wall 145 of mold cavity 136. The pins are so positioned in FIG. 1 to aid understanding of their extended position. In a commercial embodiment, when the material 101 had completely filled mold cavity 136 to this extent, it is likely that the pins would have been partially or fully retracted in order to allow the complete filling of cavity 136 with material 101.

Mold 130 may also be heated or at room temperature, depending on the material to be injected to form the outermost layer. If mold 130 is heated, mold 130 may be allowed to cool. After mold 130 reaches room temperature or after the layers have been allowed to cure for an appropriate amount of time, the formed ball may be removed from mold 130, such as by separating first mold portion 132 from second mold portion 134.

The configuration of mold interior wall 145 may be designed to mold the outer surface of the ball. Accordingly, interior wall 145 may be patterned to allow for dimples and lands and other desirable markings to be molded into the cover of the ball. The precise configuration of the outer ball surface will depend on the desired ball characteristics. A person having ordinary skill in the art will be able to easily design interior wall 145 with desired characteristics in accordance with the ball's desired characteristics without undue experimentation. The pattern of dimples on the outside of the ball may be designed independently of the characteristics for the inner layers of the ball. In the present disclosure, the dimple pattern selected does not significantly affect the structures disclosed. Accordingly, interior wall 145 in the FIGS. is shown as being smooth, rather than showing the details of a pattern.

Figure 2:
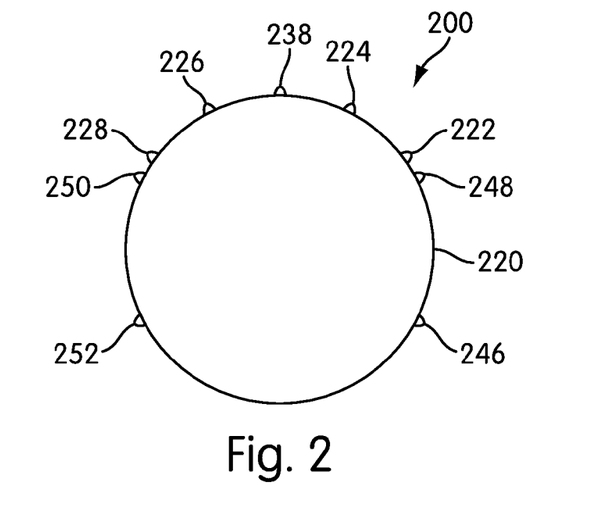
FIG. 2 is simplified side view of a ball manufactured using the mold of FIG. 1.

FIG. 2 shows an exemplary ball 200 that is made with the process shown in FIG. 1. FIG. 2 shows the existence of nine burrs on the outer surface 220 of ball 200. Outer surface 220 in many of the FIGS. is shown in simplified form as being a smooth surface. In a commercial embodiment, ball 200 would include various dimples and lands surrounding the dimples. The precise dimple pattern is not critical to the functioning of the present embodiments, so the dimple pattern has been eliminated from the FIGS. to improve understanding of the embodiments described herein.

Each of the nine burrs shown in FIG. 2 corresponds generally in position to an element in mold 130 as shown and described in FIG. 1. First burr 246, second burr 248, third burr 250, and fourth burr 252 correspond in position to the position of first pin 146, second pin 148, third pin 150, and fourth pin 152, respectively. Due to basic tolerance stack, differences in the shape of inner layers 102 and mold cavity wall 145 and other considerations, at each position where the respective pin meets mold cavity wall 145, a corresponding burr is likely to form on outer surface 220 of ball 200.

Fifth burr 222, sixth burr 224, seventh burr 226, and eighth burr 228 correspond in position to the position of first vent hole 122, second vent hole 124, third vent hole 126, and fourth vent hole 128, respectively. The vent holes are provided as openings to allow air to escape mold cavity 136. However, the vent holes are also likely to allow some degree of intrusion of material 101 into each vent hole during the molding process. This intrusion and other factors make a burr likely to form on outer surface 220 of ball 200 where it is adjacent each vent hole.

Ninth burr 238 corresponds in position to the position of injection nozzle or port 138. Because of the discontinuity of inner mold wall 145 in the area of nozzle 138, and possibly due to the properties of material 101 that may not fully separate from nozzle 138, ninth burr 238 is likely to form on outer surface 220 of ball 200 in this area.

The positioning of the various mold elements and the corresponding burrs has been simplified in the FIGS. and in the description. In a commercial embodiment, it is unnecessary and may be undesirable for all the pins, vent holes, and injection ports to align along a single plane in mold 130. A person having ordinary skill in the art is likely to design a mold where the pins, vent holes, and port are spaced from one another around mold 130. However, regardless of the specific position of each of these elements, a burr is likely to form in each area of discontinuity in a mold. Other elements in the mold may also create areas of discontinuity but have not been illustrated. The illustration of these elements and the corresponding burrs aligned on a single plane is merely for ease of illustration and understanding and the present embodiments should not be considered as being limited to situations where the burrs are so aligned.

Figure 3:
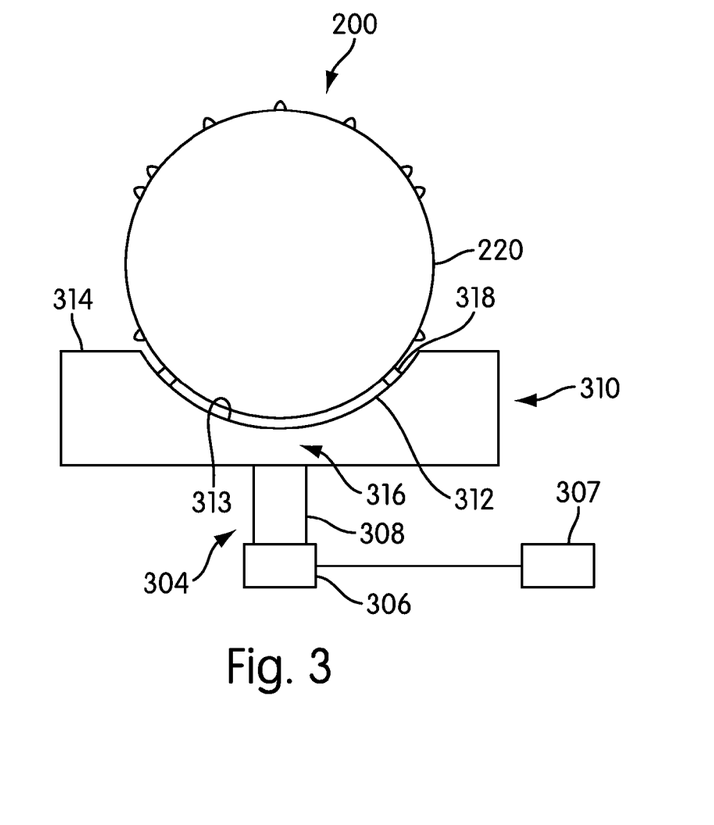
FIG. 3 is a side view of the ball of FIG. 2 inserted into a ball holder.

FIG. 3 illustrates ball 200 positioned in ball holder 310. Ball holder 310 may be any sort of holder that is capable of locating a ball in a particular position. Ball holder 310 desirably defines a recess 312 in a first surface 314. Recess 312 may be designed to correspond generally in shape and size to any ball 200 that may be placed therein. According to USGA rules, a ball that conforms to the rules may not be smaller than 1.68 inches in diameter according to current rules and should be spherical and spherically symmetrical. Depending on the position of the burrs on balls created with a particular molding structure and method, a person having ordinary skill in the art can determine the diameter and depth of recess 312 necessary to accommodate ball 200 molded with the desired molding structure and method. If balls of varying diameters are to be used in connection with the presently described embodiments, either ball holders specifically designed for each diameter of ball may be selected or the central area 316 of ball holder 310 may be modified to allow provide for an adjustment structure to allow cavity 312 to have varying diameters. Recess 312 may be designed to have a surface 313 close to outer surface 220 of ball 200 as shown in FIG. 3, but surface 313 of cavity 312 need not be close to outer surface 220 of ball 200 if it does not support ball 200.

Ball grip 318 may be included in recess 312. Ball grip 318 may be any of a variety of materials that serve to prevent ball 200 from moving relative to ball holder 310, particularly when pressure is applied to ball 200, as will be described in greater detail below. In many embodiments, grip 318 may be a rubberized strip that has adequate tack to tend to minimize slip, such as a rubberized material common to non-skid shoe soles. In other instances, grip 318 could be an adhesive adequate to retain ball 200 in recess 312 while allowing ball 200 to be removed after the deburring process has been completed. In another embodiment, grip 318 could be a mechanical clamp that mates with ball 200 to prevent movement. In many embodiments, the only contact between ball 200 and holder 310 may be through grip 318.

In some embodiments, it may be desirable that ball holder 310 rotate. Accordingly, rotator 304 may be incorporated as a part of ball holder 310. Rotator 304 may be any of a variety of structures capable of rotating ball holder surface 314. In many embodiments, rotator 304 includes motor 306 and shaft 308. Motor 306 may desirably be a standard AC electric motor. Shaft 308 may be attached directly or through a transmission to the output shaft of motor 306 and may be attached directly or through a transmission to ball holder surface 314. Other configurations may also be used. In its simplest form, rotator 304 may be a simple hand crank with an output shaft attached to ball holder surface 314. In other embodiments, an engine, DC motor or other direct or indirect drive system may be used instead of the AC electric motor. In some embodiments, it may be desirable for the rotator to be configured to be able to receive and be directed by electrical controller 307 located close to or remotely from rotator 304. Electrical controller 307 may be able to remotely control, for example, whether motor 306 is on or off and the speed at which shaft 308 and ball holder surface 314 rotate. If a transmission is used at either end of shaft 308, electrical controller 307 may also govern the gear reduction used, if multiple gears are possible.

Figure 4:
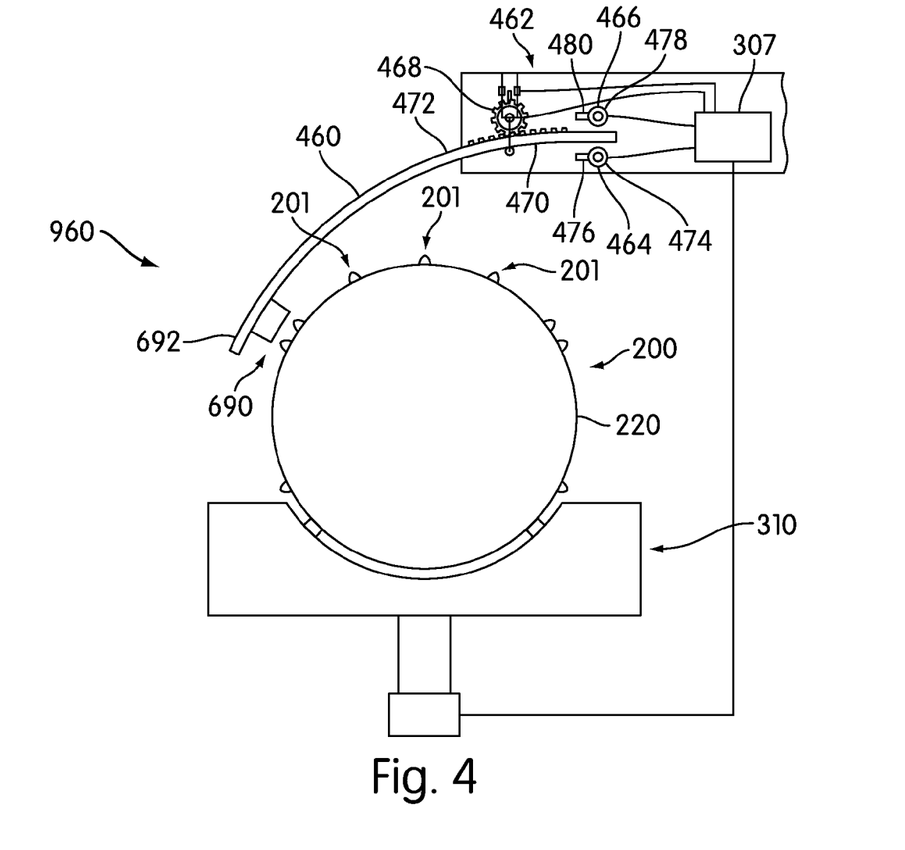
FIG. 4 is a view, partially in section, of a selective deburring structure.

Turning now to FIG. 4, an overall configuration of various elements that may be used in deburring ball 200 is shown. The basic elements are holder 310 and arm 460. These two elements interact with ball 200 to remove burrs 201 from outer surface 220 of ball 200.

Arm 460 is adjustable. The relative position of arm 460 relative to ball 200 and holder 310 is determined by the actions of positioners 462. A variety of structures can be incorporated into positioners 462. In the embodiment shown in FIG. 4, positioners 462 include a first cam 464, a second cam 466, and a gear 468.

First cam 464 is positioned adjacent first side 470 of arm 460. Second cam 466 is positioned adjacent second side 472 of arm 460. First cam 464 is rotatable and may include first central section 474 and first cam surface 476. When first cam 464 rotates, first cam surface 476 comes into contact with first side 470 of adjustable arm 460. Contact between first cam surface 476 and adjustable arm 460 changes the angular position of adjustable arm 460 relative to holder 310 and ball 200. Second cam 466 is also rotatable and may include second central portion 478 and second cam surface 480. When second cam 466 rotates, second cam surface 480 comes into contact with second side 472 of adjustable arm 460. Contact between second cam surface 480 and adjustable arm 460 changes the angular position of adjustable arm 460 relative to holder 310 and ball 200. First cam 464 and second cam 466 can be used independently of one another or may be used cooperatively to further stabilize adjustable arm 460 in a desired angular position. First cam 464 and second cam 466 may be positioned manually or may be positioned electronically. In some embodiments, first cam 464 and second cam 466 may be electronically controlled by electronic control unit 307.

Figure 5:
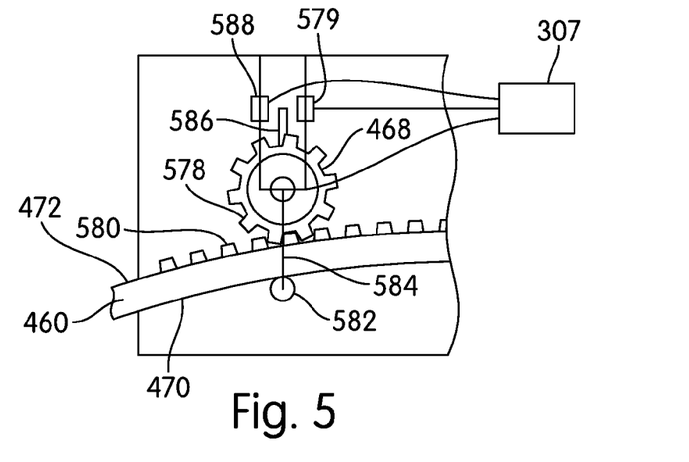
FIG. 5 is a partial cross sectional view showing a portion of the deburring structure.

Gear 468 may be used to change the effective length of arm 460 relative to holder 310 and ball 200. Gear 468 is shown in greater detail in FIG. 5. Gear 468 includes gear teeth 578. Arm 460 includes mating gear teeth 580 shown as being positioned on second side 472 of arm 460. While gear 468 and its related parts are shown as being on second side 472 of arm 460, gear 468 and its related parts and mating gear teeth 580 could instead be positioned on first side 470 of arm 460. Gear teeth 578 and mating gear teeth 580 function to change the effective length of arm 460. In the configuration shown in FIGS. 4 and 5, if gear 468 is rotated clockwise, gear teeth 578 and mating gear teeth 580 will move in a well-understood manner to move arm 460 to the left as illustrated in FIGS. 4 and 5, thereby extending arm 460 relative to holder 310 and making the effective length of arm 460 greater. Similarly, if gear 468 is rotated counter-clockwise, gear teeth 578 and mating gear teeth 580 will move in a well-understood manner to move arm 460 to the right as illustrated in FIGS. 4 and 5, thereby retracting arm 460 relative to holder 310 and making the effective length of arm 460 smaller. Gear 468 may be manually rotated by a knob or crank (not shown). In an alternative embodiment, rotation of gear 468 may be electrically controlled, such as by electric motor 579, which may also be connected to electric controller 307 to control the position of gear 468 and arm 460.

In many embodiments, gear 468 functions as a fulcrum in combination with first cam 464 and second cam 466. In such an embodiment, it may be desirable to allow gear 468 to move upward and downward to permit a greater range of motion of arm 460 relative to holder 310. Pin 582 may be attached to gear 468 and may extend on the opposite side 470 of arm 460 from gear 468. Attachment structure 584 that attaches pin 582 to gear 468 may be adjustable to correct for tolerance stack between arm 460 and gear 468 or to allow for removal of arm 460 for replacement. Attachment structure 584 is illustrated in FIGS. 4 and 5 as being a fixed arm. However, in some embodiments, attachment structure 584 could be a spring or other structure. In many embodiments, it is desirable that attachment structure 584 be designed to firmly press gear teeth 578 and mating gear teeth 580 into contact with one another.

As noted, in some embodiments, it may be desirable for the vertical position of gear 468 be adjustable to allow a greater range of motion of arm 460. In one embodiment, gear 468 may be configured to allow it to ride in slot 586. Slot 586 may be any appropriate length that allows the desired range of motion. Gear 468 may be manually adjustable by a manual slide and lock (not shown). In an alternative embodiment, the height of gear 468 in slot 586 may be governed by an electric motor, for example, or other electronic control, which may be connected to electronic control unit 307.

While a multipart system is disclosed in connection with gear 468, in some embodiments it may be unnecessary to provide the degree of complexity shown in the FIGS. In some embodiments, pin 582 and gear 468 may be fixed in place and arm 460 guided between them. Pin 582 may be a round pin as shown or may alternatively be a flat surface. The precise configuration of the pin and gear may be modified in various ways known to a person of ordinary skill in the art while still providing sufficient stability to the gear and pin system to allow it to function as a fulcrum.

Figure 6:
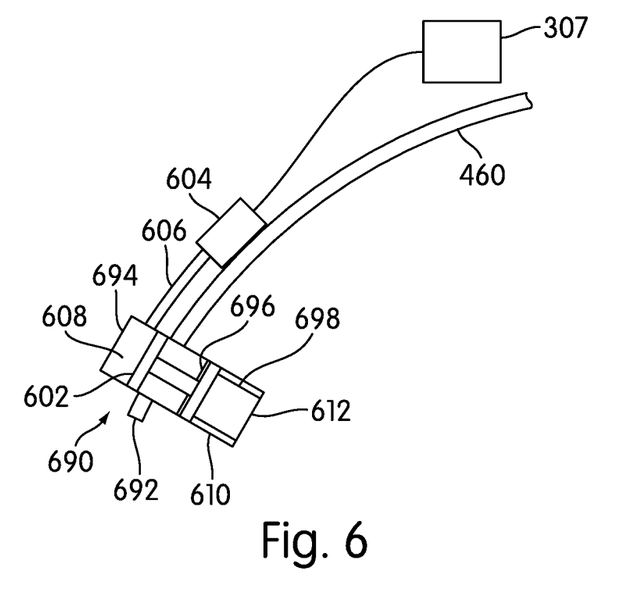
FIG. 6 is a partial side view of a first embodiment of a portion of a deburring structure.

Turning now to FIGS. 4 and 6, an additional degree of freedom is provided. Abrasive 690 is provided on arm 460. Abrasive 690 is shown in simplified form in FIG. 4 and in more detail in FIG. 6. Abrasive 690 is shown in FIGS. 4 and 6 as being positioned near free end 692 of arm 460. However, abrasive 690 need not be so positioned. Abrasive 690 may be positioned at any desirable position along arm 460. Arm 460 may, in some embodiments, not include a free end, but instead may extend in a closed curve around ball 200.

Abrasive 690 includes a variety of elements. Abrasive 690 includes a casing 694, including divider 696, reciprocating finger 698, plunger 602, hydraulic fluid input 604, and fluid transmission device 606. Abrasive 690 functions in a manner similar to other hydraulic systems. In many embodiments, hydraulic fluid input 604 may be an air compressor. When it is desired to move plunger 602 downward towards divider 696, input or compressor 604 is actuated. Fluid, such as air, is sent through tube or fluid transmission device 606 into cavity 608 adjacent plunger 602. The introduction of air or other hydraulic fluid into cavity 608 moves plunger 602 towards divider 696 and moves reciprocating finger 698 outward from open end 610 of casing 694.

Reciprocating finger 698 includes at least one abrasive surface, such as abrasive surface 612. Abrasive surface 612 may be made from a variety of materials, but may be selected in cooperation with the material from which one or more burrs 201 on ball 200 are formed. For example, the desirable hardness of abrasive surface 612 may differ depending on the material forming the burr. Abrasive surface 612 may be thin, such as if abrasive surface 612 is formed of sandpaper over a support. Alternatively, abrasive surface 612 may be coextensive with finger 698, such as if a piece of pumice, for example, were to be used as abrasive surface 612. That is, the entirety of finger 698 may be made of the abrasive material. In an embodiment where abrasive surface 612 is coextensive with finger 698, the extent of the projection of finger 698 towards ball 200 may be calculated based on the amount of finger 698 that has become worn. In an embodiment where abrasive surface 612 is thin, replacement of abrasive surface 612 may be more frequent, and a calculation, estimate, or sensor reading of the degree of deterioration of abrasive surface 612 may be less important.

When it is desired to retract finger 698, compressor or input 604 can again be actuated, but the flow reversed. In such an instance, air or other fluid would be pumped away from cavity 608 through tube 606, thereby creating a vacuum in cavity 608. Such a vacuum causes plunger 602 to move away from divider 696, thereby retracting finger 698 into casing 694.

The actuation of the hydraulic input 604 may be done manually, such as with a user pressing a button or actuating a switch (not shown). Alternatively, the actuation of hydraulic input 604 may be performed electronically, such as through electric control unit 307. If actuation is done electronically, a sensor to detect any degree of deterioration of abrasive surface 612 may be included in order to allow electric control unit 307 to more precisely control hydraulic input 604 to properly position finger 698 and abrasive surface 612 relative to holder 310, ball 200, and burrs 201.

Figure 7:
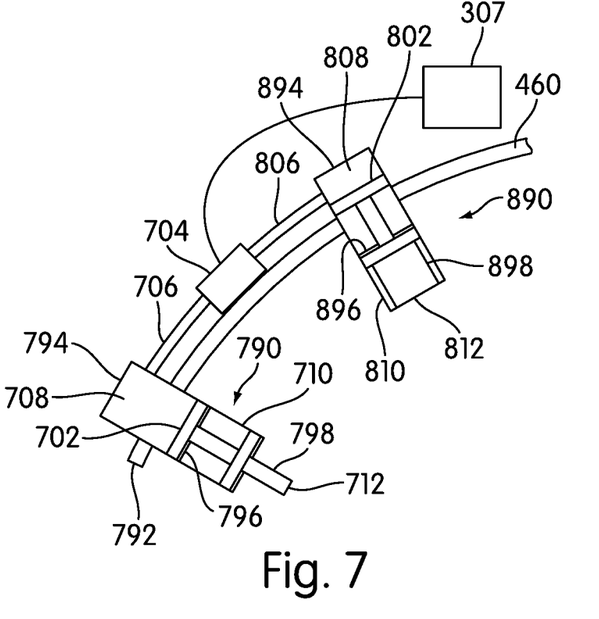
FIG. 7 is a partial side view of another embodiment of a portion of a deburring structure.

An alternative embodiment is shown in FIG. 7. FIG. 7 shows the use of a first abrasive 790 and a second abrasive 890 on the same arm 460. As shown in FIG. 7, multiple abrasives may be used on the same arm 460, and the abrasives may be independently controlled.

FIG. 7 shows a single hydraulic input 704 capable of sending hydraulic fluid through first tube or transmission device 706 and second tube or transmission device 806 independently. Such independence may be achieved by, for example, independent valving (not shown) as may be commonly understood by persons having ordinary skill in the art. The valving, as the input, may be controlled either manually through, for example, a lever (not shown) or electronically through, for example, electric control unit 307.

When it is desired to move first plunger 702 or second plunger 802 downward towards first divider 796 or second divider 896, input or compressor 704 is actuated. Fluid, such as air, is sent through first tube or fluid transmission device 706 into first cavity 708 adjacent first plunger 702. Fluid, such as air, may also be sent through second tube or fluid transmission device 806 into second cavity 808 adjacent second plunger 802. The introduction of air or other hydraulic fluid into first cavity 708 moves first plunger 702 towards first divider 796 and moves first reciprocating finger 798 outward from first open end 710 of first casing 794. The introduction of air or other hydraulic fluid into second cavity 808 moves second plunger 802 towards second divider 896 and moves second reciprocating finger 898 outward from second open end 810 of second casing 794. The reversing of the plungers is similarly accomplished in the same manner as described above in connection with the structures shown and described in connection with FIG. 6. As noted in FIG. 7, multiple fingers may be positioned in multiple positions as may be desirable or useful.

First reciprocating finger 798 includes first abrasive surface 712 and second reciprocating finger 898 includes second abrasive surface 812. As shown in FIG. 7, it may be desirable in some embodiments for first abrasive surface 712 and second abrasive surface 812 to have different shapes and sizes. It may also be desirable in some embodiments for first abrasive surface 712 and second abrasive surface 812 to be made from different materials. Otherwise, the properties of first abrasive surface 712 and second abrasive surface 812 may be the same as those described in connection with abrasive surface 612.

Having described the various components of the system, the system as a whole may be understood. In some embodiments, each of the elements described may be secured to a single casing. The use of a single casing to enclose all the elements described may be desirable, as the process of deburring can create particulate matter that may be forcefully thrown from the area of the ball. However, the use of a single casing attached directly or indirectly to each element may be unnecessary, and instead, the elements may simply be placed in position relative to one another. In such an embodiment, a protective screen to deflect any thrown particulate matter may be positioned between a user and the structure described.

The functioning of the structure as a whole may be best understood with reference to FIG. 4. In addition, the structure described herein may be used in connection with the methods and systems described in U.S. Patent Application Publication Number 2012/0149280, entitled "Method of Deburring a Ball", published on Jun. 14, 2012, the disclosure of which is incorporated herein in its entirety by reference.

Turning to FIG. 4, the deburring structure as a whole may be understood. Ball 200 is placed in holder 310. Ball 200 may be desirably positioned so that any burrs 201 thereon may be removed with the present process. In some embodiments, the ball may be marked to enable a user or machine to substantially precisely position ball 200 in holder 310 so that burrs 201 appear in predictable locations. As noted earlier, the burrs 201 appear on outer surface 220 of ball 200 in a generally predictable pattern, as burrs 201 are created generally by known and designed discontinuities in mold 130 (shown in FIG. 1). In some instances, it may be possible to mark ball 200 to enable it to be positioned in holder 310 like it is shown in FIG. 4 with burrs 201 in predicted locations. In other embodiments, one or more sensors (not shown) may be incorporated into the system to map the burrs on the ball and to designate the areas for deburring.

Arm 460 is then placed into proper position. The effective length of arm 460 may be adjusted by rotating gear 468 either clockwise or counter-clockwise. The effective angular position of arm 460 may be adjusted by rotating first cam 464, second cam 466, or both. Also looking at FIG. 6, the abrasive surface is placed in effective position by moving reciprocating finger 698 so that abrasive surface 612 is in operative position near one or more burrs. Holder 310 is then rotated. The rotation of holder 310 causes ball 200 to rotate. The rotation of ball 200 causes abrasive surface 612 to contact burrs 201 and possibly outer surface 220 of ball 200 in a ring around ball 200. This contact and relative motion allows abrasive surface 612 to wear off burrs 201 it comes into contact with and thereby to deburr at least one burr 201 from ball 200. Once ball 200 has been rotated an effective number of times or an effective length of time, arm 460 may be repositioned to remove another at least one burr 201.

The process described generally above may be repeated as many times as desirable in order to remove as many burrs as are deemed desirable. In some embodiments, mold 130 may be designed to place as many burrs as possible in such a manner that they can be removed in a single abrasive pass, thereby minimizing the number of abrasive passes necessary and minimizing harm to the outermost cover or surface layer of ball 200.

Figure 8:
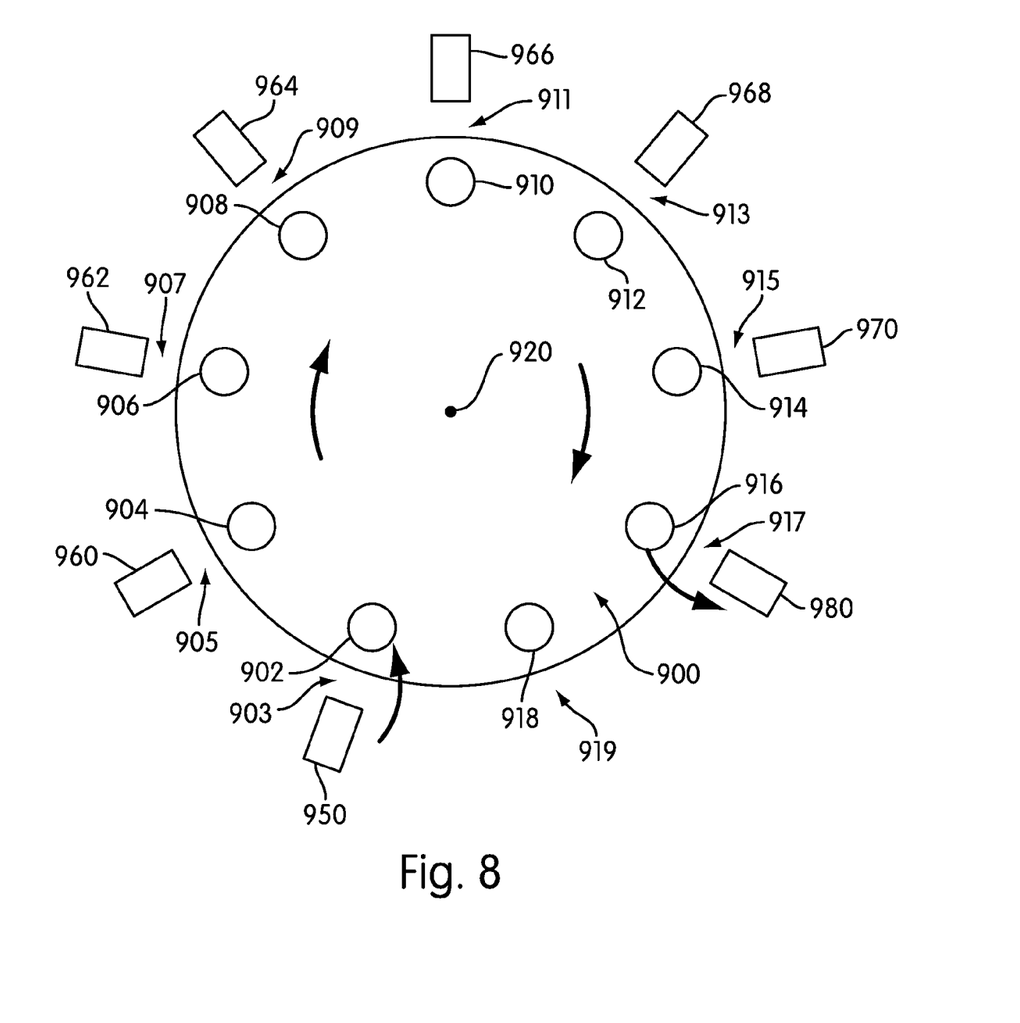
FIG. 8 is a top view of a ball holder plat.
Figure 9:
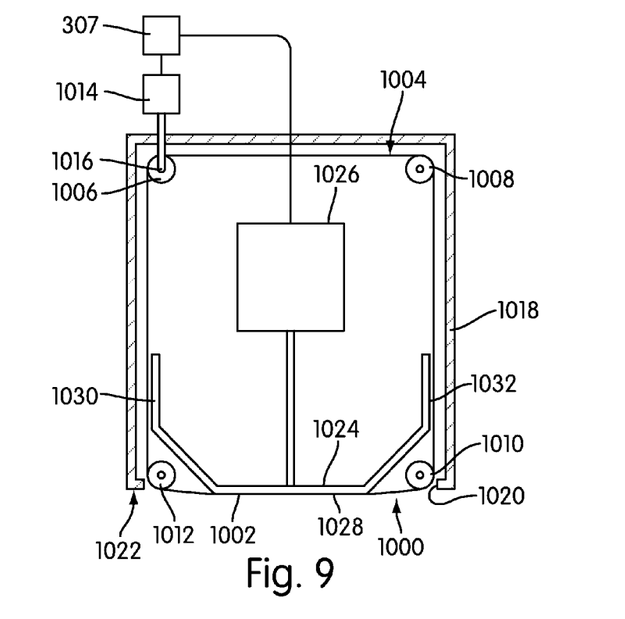
FIG. 9 is a top view, partially in section, of an abrasive.
Figure 10:
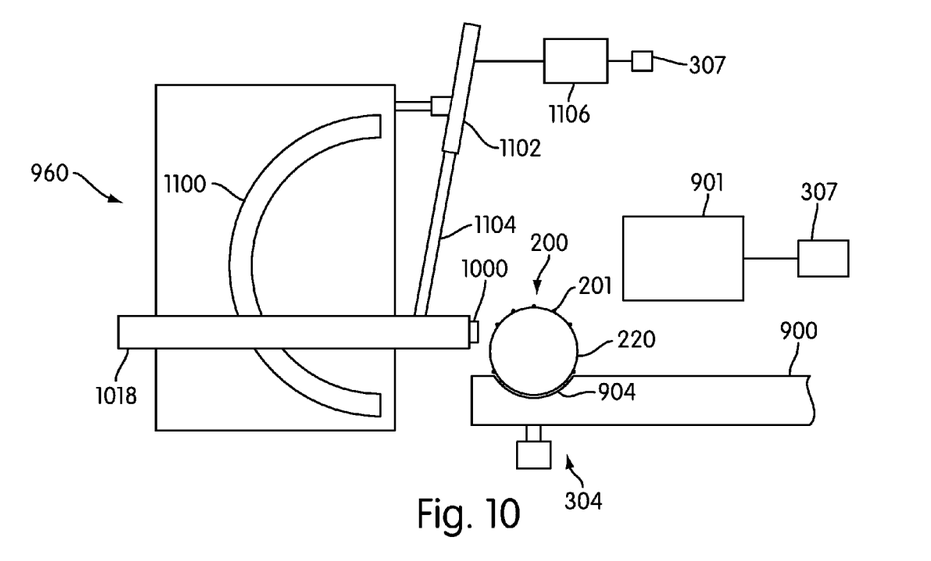
FIG. 10 is a partial side view of another embodiment of a portion of a deburring structure.

An alternative embodiment is shown in FIGS. 8-10. In some circumstances, it may be desirable that instead of using a single, movable arm that is positioned sequentially adjacent a series of burrs on a ball, instead it may be desirable to use a plurality of arms that are each placed to remove one or more burrs on a ball. Such a structure is shown in FIGS. 8-10.

FIG. 8 shows ball holder plate 900. Ball holder plate 900 may also include axis 920. Ball holder plate 900 may be configured to be rotatable about axis 920. Ball holder plate 900 may include a fixed axis 920 with a driving rotator located outwardly from axis 920 or rotating motion may be generated from a rotator located at axis 920.

Ball holder plate 900 may include a plurality of ball holder recesses. These may include first ball holder recess 902, second ball holder recess 904, third ball holder recess 906, fourth ball holder recess 908, fifth ball holder recess 910, sixth ball holder recess 912, seventh ball holder recess 914, eighth ball holder recess 916, and ninth ball holder recess 918. In some embodiments, a ball (not shown) may be placed with conventional apparatus (not shown) into first ball holder recess 902. The ball may be placed in first ball holder recess 902 to be positioned in the same relative position as ball 200 was shown as being placed in ball holder 310. A sensor 901 (see FIG. 10) may be used to verify the orientation of a ball placed in first ball holder recess 902, to ensure that each burr on the ball is exposed and is available to be removed. The mechanism used to insert the ball may be any of a variety of conventional ball placement apparati, and is labeled generally as 950. The insertion of an exemplary ball into first ball holder recess 902 is shown by an arrow.

Because ball holder plate 900 rotates about axis 920, each ball holder recess may take a variety of positions. In the embodiment shown, because there are nine recesses, there are nine corresponding positions, and the precise configuration is exemplary only. A ball may be placed into first ball holder recess 902 when recess 902 is in position 903 adjacent inserter 950. Plate 920 then may be rotated, as is shown by the arrows positioned in a clockwise manner on plate 920. The use of a clockwise rotation is exemplary, and a counterclockwise rotation may be used where desired. Recess 902 may rotate from insertion position 903 into a first abrading position 905 adjacent first abrader 960, the structure and function of which will be described in greater detail below. First abrader 960 may perform a first abrading step on the ball. After the completion of first abrading step by first abrader 960, the ball in recess 902 may rotate from first abrading position 905 into second abrading position 907 adjacent second abrader 962 to undergo a second abrading step. After the completion of first abrading step by first abrader 960, recess 902 may rotate from first abrading position 905 into second abrading position 907 adjacent second abrader 962 to cause the ball to undergo a second abrading step. After the completion of second abrading step by second abrader 962, recess 902 may rotate from second abrading position 907 into third abrading position 909 adjacent third abrader 964 to cause the ball to undergo a third abrading step. The ball may be further rotated into fourth abrading position 911 adjacent fourth abrader 966, fifth abrading position 913 adjacent fifth abrader 968, and sixth abrading position 915 adjacent sixth abrader 970. The ball may undergo a correspondingly numbered abrading step in each corresponding position. Each abrader may have the same configuration. Accordingly, when a structure is referred to as abrader 960, it is understood that such an abrader could take any position around ball holder plate 920.

After the ball has proceeded through all the abrading steps, the ball and recess 902 may reach the removal recess position 917. Removal recess position 917 may be adjacent any conventional ball removal apparatus, and that apparatus is numbered generally as 980. The removal of the ball from ball holder plate 900 at removal recess position 917 is shown generally by an arrow. Once the ball has been removed, ball holder recess 902 may move into a rest position 919. Rest position 919 between removal position 917 and insertion position 903 may be optionally used where it is deemed desirable to prevent interference between inserter 950 and remover 970, to accommodate other ball transport equipment, or for any other reason.

The use of nine ball holder recesses and this series of positions may be varied. For example, if desired, an alignment recess position may be incorporated between insertion recess position 903 and first abrasion position 905. Such an alignment recess position may be used to verify the position of the ball within the recess, rather than incorporating such an alignment function into the insertion position. If desired, an alignment recess position may be incorporated between two adjacent treatment positions to ensure that the ball has not moved during treatment at the prior recess position.

The selection of a particular size and number of recesses in ball holder plate 900 may vary depending on the manufacture of the balls to be treated. As noted earlier, the number of burrs on any ball may be dependent on the number of runners and gates incorporated into the mold in which the ball is manufactured. The number and size of the gates used may vary from ball to ball, depending on the material used to make the ball cover, the thickness of the cover, the temperature at which the ball is molded, and many other factors. The apparatus used may be configured to be modular. For example, if only two abrasion positions were necessary, the different ball holder plate may be configured to have only 4 recesses and corresponding positions, namely, an insertion position 903, two abrasion positions 905 and 907, and a removal recess 917.

In addition, it may be desirable to have multiple insertion positions and multiple removal positions along the same ball holder plate. In such a configuration, a first ball insertion apparatus 950 may be positioned adjacent insertion position 903. A ball may be inserted at insertion position 903 and passed through, for example, two treatment positions, such as a first treatment position 905 and a second treatment position 907. A ball removal apparatus 980 may be positioned adjacent position 909, and 909 may become a removal position. A second ball insertion apparatus 950 may also be positioned adjacent ball holder position 911, so that ball holder position 911 may become an insertion position. A ball inserted at ball holder position 911 may be rotated through two treatment positions, such as a first treatment position 913 and second treatment position 915, and the ball may be removed at ball removal position 917 by ball removal apparatus 980. A respective ball may thus be simultaneously inserted at each respective insertion position 903 and 911. Each ball would be simultaneously treated respectively at two ball holder recess positions, namely positions 905 and 907 and positions 913 and 915, respectively. Each respective ball may then be simultaneously removed at each respective removal position 909 and 917. In such a configuration, two balls could be treated at the same time.

Alternatively, if a ball only requires a number of treatments fewer than that the plate is capable of accommodating, and it is not desired to modify the overall configuration of the structure, the ball may be inserted into ball holder plate 900 at insertion position 903 and be extracted at removal position 917 and receive the designated number of treatments at corresponding number of positions along the plate 900. In any remaining recesses, the ball may simply remain in the recess without any activity. For example, if only four abrasion treatments were necessary, only four abraders may be used adjacent four corresponding ball positions around ball holder plate 900. Other ball positions would not have any equipment adjacent thereto and the ball would remain untreated in those positions.

A structure similar to those disclosed above may be incorporated at each of the abrasion ball positions as an abrader 960. In such a structure, an arm 460 is positioned in a designated position at each abrasion or treatment position of ball holder plate 900. As noted above, each arm 460 may be manually moved to a designated position or the position of each arm may be controlled by an electronic control unit 307. In such a configuration, a ball 200 may be rotated into a treatment position, such as first treatment position 905. First treatment arm 460 and first abrasive 690 may then be moved into a first effective position to effectively remove one or more burrs 201 as described in greater detail above. After such a treatment, rather than moving first treatment arm 460 and first abrasive 690 to a second effective position, first treatment arm 460 and first abrasive 690 may be moved away from exemplary ball 200 in first treatment position 903. Ball recess plate 900 may then rotate and exemplary ball 200 may then be positioned in second treatment or abrasion position 905. At second abrasion position 905, another first treatment arm 460 and another first abrasive 690 may be present. This another first treatment arm 460 and this another first abrasive 690 may then be moved into a second effective position to effectively remove another burr 201 from ball 200. As ball 200 rotates through each treatment position on ball recess plate 900, it may receive a desired series of treatments from each first treatment arm 460 and each first abrasive at each treatment position. Any of the embodiments noted above, such as those with multiple abrasives and various actuation elements, maybe substituted easily in such a configuration by a person having ordinary skill in the art without undue experimentation.

FIG. 9 shows a first abrasive 1000. First abrasive 1000 may have a number of components. First abrasive 1000 may include a first abrasive surface 1002. First abrasive surface 1002 may, in some embodiments, be formed of a sheet-like abrasive. In some embodiments, first abrasive surface 1002 may be a sheet of sandpaper. First abrasive surface 1002 may be a continuous loop 1004 of abrasive. Continuous loop 1004 may be of sufficient length to extend around a series of rotatable pulleys. In the embodiment shown in FIG. 9, the rotatable pulleys include first rotatable pulley 1006, second rotatable pulley 1008, third rotatable pulley 1010, and fourth rotatable pulley 1012. While four rotatable pulleys are shown, another number of rotatable pulleys may be deemed desirable by a person having ordinary skill in the art. The use of four rotatable pulleys in FIGS. 9 and 10 is merely exemplary. In some embodiments, one of the rotatable pulleys may be a drive pulley and the remaining pulleys may simply rotate about an axis. In other embodiments, each pulley may be a drive pulley.

In the embodiment shown in FIG. 9, first rotatable pulley 1006 may be a drive pulley. First rotatable pulley 1006 may be driven by a drive motor 1014 shown generally connected to first rotatable pulley 1006. In some embodiments, drive motor 1014 may be drive first rotatable pulley 1006 by rotating first rotatable pulley 1006 by its axis 1016. In other embodiments, first rotatable pulley 1006 may be rotated other than by its axis, such as by a set of gear teeth (not shown), a magnetic drive, or any other drive system that may be deemed desirable by a person having ordinary skill in the art. Drive motor 1014 may be manually actuated or control of drive motor 1014 may be controlled by electronic control unit 307.

In some embodiments, such as that shown in FIG. 9, continuous loop 1004 and the rotatable pulleys 1006, 1008, 1010, and 1012 may be designed in a manner so that loop 1004 fits snugly against each pulley in operation. This feature may be accomplished with a variety of structures. In one embodiment, loop 1004 may be made from a material that has some resilience. When such a loop 1004 is placed around first pulley 1006, second pulley 1008, third pulley 1010, and fourth pulley 1012, in some embodiments, the loop 1004 may be slightly loose, as it will be deformed in use, as will be described in greater detail below. In other embodiments, the loop may have sufficient resilience and be of such a shape and size that it may fit snugly around first pulley 1006, second pulley 1008, third pulley 1010, and fourth pulley 1012. In other embodiments, loop 1004 may be designed to be of a fixed length and have minimal resilience. In such an embodiment, loop 1004 may be slightly loose around first pulley 1006, second pulley 1008, third pulley 1010, and fourth pulley 1012 when not in use and fit more snugly while in use, as will be described in greater detail below. In some embodiments, a lock or guide may be incorporated with or adjacent at least one of the pulleys to reduce the risk of loop 1004 slipping off or otherwise becoming detached from the pulley system.

In the embodiment shown in FIG. 9, loop 1004 is shown in a position where it is not in use. As may be noted, a case 1018 may surround much of the pulley and loop structure. In the embodiment shown in FIGS. 8-10, case 1018 is rectangular. However, other shapes may be used. In some embodiments, case 1018 may be made at least partially of a resin or plastic. In other embodiments, case 1018 may be made of metal. In many embodiments, it may be desirable to use a substantially closed structure. In other embodiments, it may be desirable to use a substantially open structure. In many embodiments, it may be desirable for loop 1004 to be within case 1018 while in its rest position. In some embodiments, case 1018 may have a removable top to allow for servicing or replacement of any of the interior parts. In many embodiments, case 1018 may include at least one aperture 1020 along one side 1022.

A purpose for aperture 1020 may be to allow loop 1004 to project outwardly from case 1018. As shown in FIG. 9, a reciprocating finger 1024 may be reciprocally positioned within case 1018. Reciprocating finger 1024 may be coupled to a reciprocating drive 1026. Reciprocating drive 1026 may be any system that is capable of moving reciprocating finger 1024 in and out of case 1018 through aperture 1020. In some embodiments, reciprocating drive 1026 may be a hydraulic pump that moves reciprocating finger 1024 in a manner similar to that described for reciprocating finger 698 earlier, and this description is not repeated here, such as via an air compressor or other fluid input. As described above, reciprocating drive 1026 may be manually actuated or may be further connected to electronic control unit 307, which may control its motion.

When reciprocating finger 1024 moves outwardly from case 1018 (shown as downwardly in FIG. 9), it engages loop 1004. The outward movement of reciprocating finger 1024 causes the tightening of loop 1004 around first pulley 1006, second pulley 1008, third pulley 1010, and fourth pulley 1012. When first drive pulley 1006 is engaged, loop 1004 may rotate around first pulley 1006, second pulley 1008, third pulley 1010, and fourth pulley 1012 and against engaging surface 1028 of reciprocating finger 1024. Engaging surface 1028 may be any desired size and shape, and the size and shape of engaging surface 1028 shown in FIG. 9 is merely exemplary. Also as shown in FIG. 9, reciprocating finger 1024 may include first guide 1030 and second guide 1032. First guide 1030 and second guide 1032 may serve as guides for loop 1004 during the rotation of loop 1004. The use of guides such as first guide 1030 and second guide 1032 may be desirable in some embodiments and eliminated in other embodiments.

The structure shown in FIG. 9 may be placed adjacent the structure shown in FIG. 8 to deburr the ball. One possible embodiment of an abrader 960 is shown in FIG. 10. A ball, such as ball 200 is placed in a ball holder recess, such as ball holder recess 904. Casing 1018 is moved into a desired position. In the embodiment shown in FIG. 10, casing 1018 is slidably attached to a C-shaped projection or channel 1100. Any desired structure may be used for such a slidable attachment. For example, casing 1018 may include one or more fingers (not shown) that project into a channel or around a projection 1100. The use of a corresponding projection and channel, regardless of which element the projection and channel appear on cause the casing 1018 and projection 1100 to include a camming function that causes the rotation of the casing 1018 relative to the projection 1100. The relative position of casing 1018 and projection or channel 1100 may be controlled by any desired system. In the embodiment shown in FIG. 10, a hydraulic arm 1102 may be used. When the lower arm 1104 projects to the outwardly position shown in FIG. 10, the interaction of the finger and channel 1100 may function to move the casing to a generally horizontal position. When hydraulic arm 1104 moves more inwardly, casing 1018 may be forced to move along channel 1100 to assume a different angular position. In this manner, casing 1018 may be positioned in a variety of angular positions relative to ball 200. The projection of lower arm 1104 from arm 1102 may be controlled by a hydraulic pump 1106. Hydraulic pump 1106 may be controlled manually or may be connected to electronic control unit 307. The use of a hydraulic arm and pump are merely exemplary. Other mechanisms well-known to people having ordinary skill in the art may be used to move casing 1018 to various positions. Such mechanisms may be controlled manually or by electronic control unit 307.

Once ball 200 is placed in ball holder recess 904, an optional sensor 901 may be used to ensure that ball 200 is properly positioned. Sensor 901 may alternatively be designed to sense the position of any burrs 201 on ball 200. Information on the position of ball 200 or burrs 201 may be transmitted to electronic control unit 307 or may be transmitted directly to a user via an interface. Once ball 200 or burrs 201 are properly positioned, the deburring may take place. As noted earlier, the use of a sensor 901 may be optional and a sensing step may be performed at each position, may be done only once, or may not be done at all. Once the optional sensing step is performed, a deburring step may occur.

As noted in the process as described in connection with other embodiments, casing 1018 may be moved along channel or projection 1100 to an appropriate location. Reciprocating drive 1026 may then be actuated to cause finger 1024 and abrasive 1000 to project through aperture 1020 to be positioned at a burr 201. Rotator 304 may then be actuated to rotate ball 200 and drive motor 1014 may be actuated to rotate loop 1004. Abrasive 1000 may thereby be brought into contact with a corresponding burr 201 for a predetermined period of time. After the predetermined period of time has passed, the rotator 304 and drive motor 1014 may be deactivated. Ball holder plate 900 may then be rotated to bring another ball 200 into position 904 for removal of the same burr 201 at that station.

As ball 200 rotates through its designated positions, at each station, one or more burrs 201 may be removed from ball 200. Each station may correspond with a ball recess position and may include a casing and channel system as shown in FIG. 10. Each station may position casing 1018 in a different angular position along channel 1100 to remove a different burr 201 from ball 200. In such a manner, each station would represent one possible position to which finger 1024 may be moved as was the case in the previous embodiments.

In some embodiments, it may be desirable for casing 1018 to assume a plurality of positions, similar to the arm 460 as described in previous embodiments. In such an embodiment, casing 1018 may be moved to a desired location, finger 1024 may be actuated to extend to be positioned adjacent burr 201, and ball 200 may be rotated for a designated period of time. Finger 1024 may then be retracted and casing 1018 may be moved through the camming action between the channel and finger to an alternate position. The same structure and method can then be used to remove another burr or set of burrs from a ball.

Accordingly, casing 1018 may be considered to be the same as arm 460. Casing 1018 may be considered to be an adjustable arm capable of moving relative to ball holder recesses, such as ball holder recess 904 as shown in FIG. 10. Finger 1024 may be considered to be similarly attached to and capable of reciprocating relative to arm 1018. When arm 1018 is moved to a desired position, it may be considered to have an effective length and angular position relative to the channel or finger 1100 and relative to ball holder recess 904. Each casing may be considered a separate arm.

While various embodiments of the invention have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

What is claimed is:

1. A deburring structure, comprising:
   a ball holder;
   an adjustable arm capable of moving relative to the holder, the arm having a first side and a second side;
   a first finger attached to and capable of reciprocating relative to the arm and including an abrasive surface;
   an electronic control electrically attached to the finger and capable of controlling a position of the first finger relative to the arm; and
   a first cam positioned adjacent the first side of the arm and a second cam positioned adjacent the second side of the arm, the first cam and the second cam each capable of moving into contact with the arm and thereby modifying a position of the arm.

2. The deburring structure according to claim 1, further comprising an air compressor operatively connected to the first finger and the electronic control, the air compressor being capable of governing the reciprocation of the finger.

3. The deburring structure according to claim 1, further comprising a second finger attached to and capable of reciprocating relative to the arm and including a second abrasive surface, the electronic control being capable of controlling a position of the second finger independent of the first finger.

4. The deburring structure according to claim 3, further comprising a hydraulic fluid input operatively connected to each of the first finger and the second finger and capable of governing the reciprocation of each finger independently of the other.

5. The deburring structure according to claim 1, wherein rotation of the first cam changes an effective angular position of the arm.

6. The deburring structure according to claim 5, wherein the first cam has a first cam surface, the first cam being rotatable such that rotation of the first cam brings the first cam surface into contact with the first side of the arm, thereby changing the effective angular position of the arm.

7. The deburring structure according to claim 5, wherein rotation of the second cam changes the effective angular position of the arm.

8. The deburring structure according to claim 1, further comprising a gear capable of modifying a position of the arm.

9. The deburring structure according to claim 8, wherein the gear is rotationally and slidably movable relative to the at least one cam.

10. The deburring structure according to claim 1, wherein the first finger is capable of reciprocating linearly relative to the arm.

11. A structure for deburring a ball, comprising:
    a ball holder;
    an arm having an effective length and an effective angular position relative to the ball holder, the arm having a first side and a second side;
    a first cam positioned on the first side of the arm capable of moving the arm to change the effective angular position of the arm relative to the ball holder; and
    a gear positioned on one of the first side or the second side of the arm and capable of moving the arm to change the effective length of the arm relative to the ball holder.

12. The structure for deburring a ball according to claim 11, further comprising a second cam positioned on the second side of the arm capable of moving the arm to change the effective angular position of the arm relative to the ball holder.

13. The structure for deburring a ball according to claim 11, wherein rotation of the first cam changes the effective angular position of the arm.

14. The structure for deburring a ball according to claim 11, further comprising a finger reciprocally attached to the arm, the finger including an abrasive surface.

15. The structure for deburring a ball according to claim 11, further comprising a first finger reciprocally attached to the arm having a first abrasive surface and a second finger spaced from the first finger and independently reciprocally attached to the arm having a second abrasive surface.

16. The structure for deburring a ball according to claim 14, further comprising an electronic control electrically attached to the cam and capable of controlling the effective angular position of the arm relative to the ball holder.

17. The structure for deburring a ball according to claim 11, further comprising an electronic control capable of determining and controlling the effective length and the effective angular position of the arm.

18. A structure for deburring a ball, comprising:
    a plurality of arms, each arm being capable of moving to a designated position;
    a plurality of spaced ball holder recesses, each ball holder recess capable of holding a ball, at least one of the ball holder recesses corresponding in position to at least one of the plurality of arms;
    a plurality of abrasives, each abrasive being attached to and capable of reciprocating relative to a corresponding one of the plurality of arms; and
    wherein each arm moves to its designated position by a camming structure.

19. The structure for deburring a ball according to claim 18, further comprising a ball holder plate defining the plurality of ball holder recesses, wherein the plurality of arms are each disposed in a position adjacent the ball holder plate and the ball holder plate is rotatable to advance each of the plurality of ball holder recesses from a first position to a second position with respect to the plurality of arms.

20. The structure for deburring a ball according to claim 18, wherein an electronic control unit controls the movement of each of the arms independently of one another.

* * * * *